United States Patent [19]
May

[11] Patent Number: 6,100,717
[45] Date of Patent: Aug. 8, 2000

[54] LINE DRIVER CIRCUIT WITH REDUCED POWER CONSUMPTION

[75] Inventor: Michael R. May, Austin, Tex.

[73] Assignee: Motorola Inc., Schaumburg, Ill.

[21] Appl. No.: 09/174,148

[22] Filed: Oct. 16, 1998

[51] Int. Cl.[7] .............................................. H03K 19/0175
[52] U.S. Cl. ................................................ 326/83; 326/30
[58] Field of Search .................................. 326/26, 30, 82; 327/108, 109, 110, 111, 112, 55, 57, 67

[56] References Cited

U.S. PATENT DOCUMENTS 5,509,078  4/1996  Hiraoka et al. .............................. 381/1

OTHER PUBLICATIONS

Linear Technology Application, Note 16, AN16–19 (1 page).
National Semiconductor Application, Note AN–29, pp. 60–61 (2 pages.).
Sedra, et al., "Microelectronic Circuits", Second Edition, Chpt. 3, pp. 86–149, (1987).

*Primary Examiner*—Michael Tokar
*Assistant Examiner*—Anh Tran
*Attorney, Agent, or Firm*—Robert L. King; Keith E. Witek

[57] ABSTRACT

A differential line driver circuit has a first operational amplifier (202) and a second operational amplifier (204). The operational amplifiers use resistors (214a, 214b, 218a, and 218b) to translate to the input voltages (206 and 208) to output voltages and VOP and VON. Feedback paths containing resistors (216a and 216b) are used to monitor output conditions whereby impedance may be actively synthesized within the operational amplifiers (202 and 204). The combination of the synthesized impedance within the operation amplifiers (202 and 204) and the physical resistance of the elements (220a and 220b) are sufficient to match the line resistance (222) of a communication line. While obtaining impedance matching in accordance with required specifications, the synthesized impedance will allow for the line driver (200) to operate with significantly reduced power consumption.

19 Claims, 4 Drawing Sheets

LINE DRIVER CIRCUIT WITH REDUCED POWER CONSUMPTION

FIELD OF THE INVENTION

The present invention relates generally to integrated circuit (IC) design or printed circuit board (PCB) design, and more particularly to, a line driver circuit useful for reducing signal swing in telecommunication applications (e.g., asymmetric digital subscriber line (ADSL) applications) so that power consumption is reduced.

BACKGROUND OF THE INVENTION

In the integrated circuit (IC) industry, electrical circuits are used to drive single or differential signals along telephone lines, cables, or other communication media. One such circuit is illustrated in FIG. 1. Specifically, FIG. 1 illustrates a prior art circuit 10 which is used for communicating voltage signals over great distances (e.g., up to many miles). Circuit 10 contains a first operational amplifier (op amp) 12 and a second operational amplifier (op amp) 14. The operational amplifier 12 is used to communicate a first half (e.g., positive signal) of a differential output signal and the operational amplifier 14 is used to communicate a second half (e.g., negative signal) of the differential output signal.

Operational amplifier 12 has a positive terminal that is connected to a ground power supply 20. A negative terminal of operational amplifier 12 is coupled through a resistor 24a to receive a positive input voltage 16 (VINP) for driving the circuit. In addition, the negative terminal of the operational amplifier 12 is coupled through the resistor 26a to the output 31a of the operational amplifier 12.

In a similar manner, a positive terminal of the operational amplifier 14 is coupled to a power supply (ground (GND)) 22. A negative terminal of the operational amplifier 14 is coupled through a resistor 24b to a negative input voltage (VINN) 18 which supplies an input voltage to the circuit. The negative terminal of the operational amplifier 14 is also coupled through a resistor 26b to the output 31b of the operational amplifier 14.

The output of operational amplifier 12 is connected through a resistor 28a to an output terminal 29a. The output of the operational amplifier 14 is connected through a resistor 28b to the output terminal 29b. The differential output 29a and 29b is used to communicate the two voltages provided by the circuitry of FIG. 1 to an external communication infrastructure. The external communication infrastructure will have a resistive load (RL) symbolized by resistor 30 in FIG. 1.

In the telecommunications industries, standards require that the resistive load 30 be matched to the source impedance of the circuit 10 in FIG. 1. This matching of the source impedance of the line driver circuit with the load resistance (RL) 30 reduces signal reflection and generally enhances performance of the communication system. In order to obtain the impedance matching, the resistors 28a and 28b are both set to half the line resistance (RL) whereby resistors 28a and 28b each have a resistance of RL/2. Note that the operational amplifiers 12 and 14 contribute no significant resistance to the source resistance of the line driver circuit in FIG. 1.

The problem with the impedance settings in FIG. 1 is that the voltages driven on the nodes 31a and 31b respectively by the op amps 12 and 14 must be twice the voltage which needs to be present for communication at the output terminals 29a and 29b. For example, if a differential signal of 10 volts needs to be provided across the load 30 where a voltage at terminal 29a is to be +5.0 volts and a voltage at terminal 29b is to be −5.0 volts, then a voltage at node 31a must be driven to 10.0 volts and a voltage at node 31b must be driven to −10.0 volts. The resistors 28a, 30, and 28b function as voltage dividers whereby the operational amplifiers 12 and 14 must drive greater voltages onto nodes 31a and 31b to get proper output voltage magnitudes of +5.0 volts and −5.0 volts at the line driver outputs 29a and 29b. Generically stated, in order to get a voltage X provided to the load (RL) 30, the operational amplifiers 12 and 14 must provide a voltage of two times X at points 31a and 31b. Therefore, the amount of power consumed by the circuit 10 of FIG. 1 is excessive.

Therefore, a need exists in the integrated circuit and telecommunications industries for a line driver that can drive adequate voltage levels at the line driver output terminals 29a and 29b without consuming a significant amount of power in the line driver op amp circuitry. In addition, it would be beneficial if the low power line driver could easily lie designed and manufactured using standard process technology. Addition of complex architectures to reduce power consumption could be problematic, as the design becomes more difficult and manufacturing less reliable, whereby complexity should be avoided. Also, a low power line driver would be more likely to be useful if it consumed a minimal amount of silicon surface area on an integrated circuit (IC) die.

Figure 1:
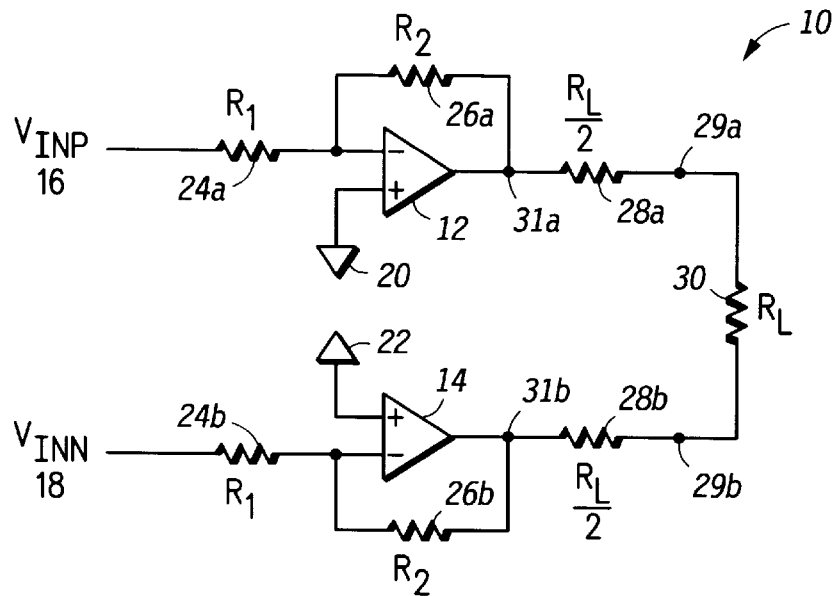
FIG. 1 illustrates, in a circuit schematic, a line driver circuit that consumes a significant amount of power in accordance with the prior art.

It will be appreciated that for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DESCRIPTION OF A PREFERRED EMBODIMENT

Generally, the line drivers herein teach single-ended and differential line drivers that use synthesized impedance(s) to provide line impedance matching. By sensing the current being sourced by the line driver, it is possible to provide feedback to the amplifier(s) such that the impedance seen by the transmission line is at least partially created by adjusting the closed loop gain of the amplifier based on the current delivered by the amplifier into the load. This is advantageous over the prior art in that it allows the amplifiers to be designed to lower voltage specifications. This is possible because, in the prior art, the impedance matching is accomplished using discrete components external to the amplifier(s) and not synthesized op amp impedance. The use of discrete components in the prior art results in adverse voltage division occurring between the discrete matching impedance and the line impedance. As a result of this voltage division, the amplifier(s) need to provide a voltage at its output that is approximately twice the voltage actually needed at the line (see discussion in the Background). Therefore, the advantage of using lower drive voltages at the amplifier is realized over the prior art when at least part of the matching impedance is synthesized within the amplifier(s) and the associated feedback network of the op amp(s).

Figure 2:
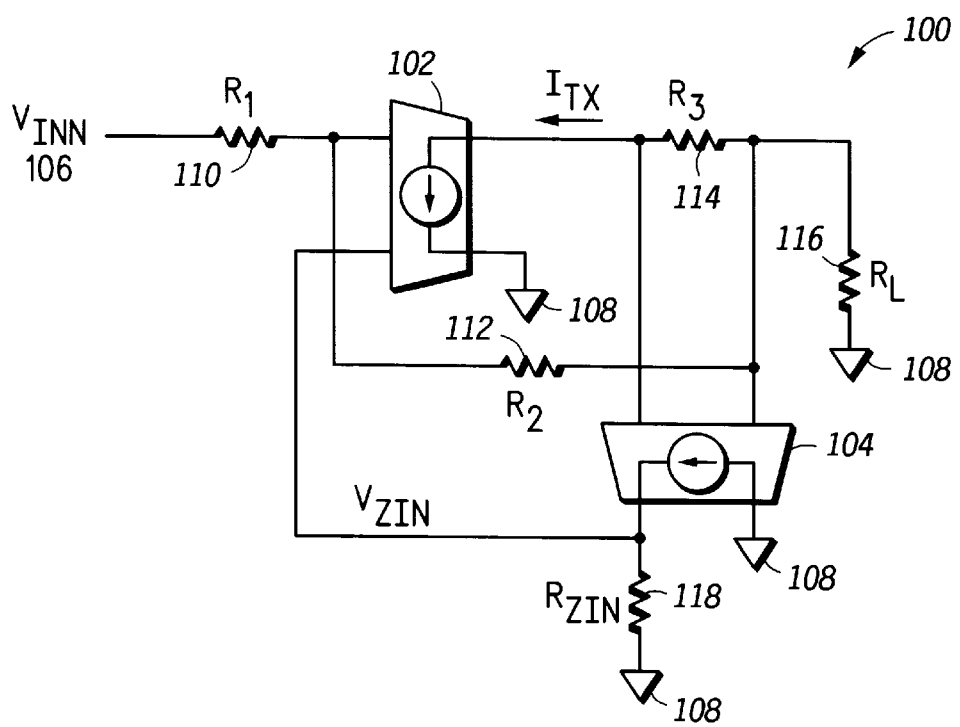
FIG. 2 illustrates, in a circuit schematic, a circuit for using a second operational amplifier to synthesize impedance in a first operational amplifier whereby the power consumption of the line driver can be reduced in accordance with the present invention.

FIG. 2 illustrates a first embodiment of the present invention. Specifically, FIG. 2 illustrates a circuit 100 which reduces the overall voltage that is supplied from an amplifier while still being able to drive the standard load line impedance with an acceptable voltage level. Such a circuit has been shown to significantly reduce power consumption in a line driver without compromising signal transmission.

Figure 3:
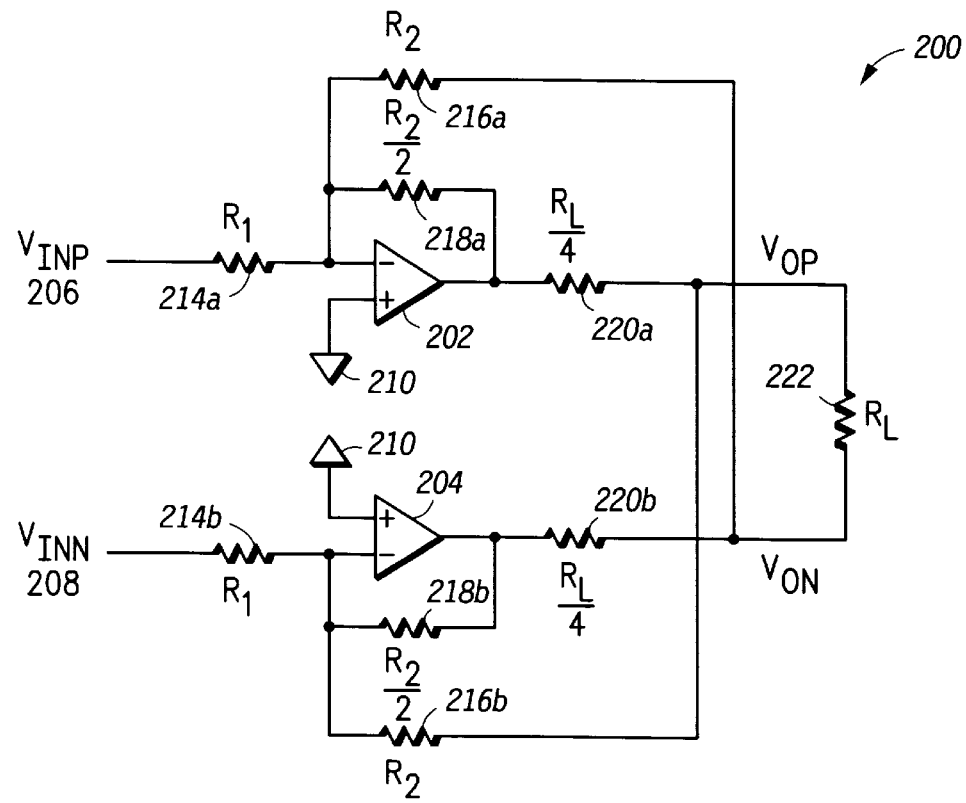
FIG. 3 illustrates, in a circuit schematic, another circuit which uses resistive feedback paths to synthesize source impedance using operational amplifiers whereby the power consumed by a line driver may be reduced in accordance with the present invention.

Circuit 100 includes resistors 110, 112, 114, 116, and 118, and operational amplifiers (op amps) 102 and 104. Resistor 110 has a resistance value of R1. Resistor 110 has a first node connected to receive a single-ended input voltage (VINN) 106 and a second node connected to a first input of amplifier 102. It is important to note that while the circuit of FIG. 2 is shown to be single-ended, that the circuit of FIG. 2 could be repeated (e.g., as such repetition is shown in FIG. 3) to result in a differential line driver using the circuit of FIG. 2. The single-ended input of amplifier 102 is further coupled to a first input of resistor 112 (with a resistance value of R2) as shown in FIG. 2. A second input of amplifier 102 is connected to a first input of resistor 118 (with a resistance value of RZIN). Resistor 118 is connected to the voltage reference terminal 108 (which is preferably ground or GND).

A first output node of amplifier 102 is connected to the first input of resistor 114 (with a resistance value of R3), and a second output node of amplifier 102 is connected to a voltage reference terminal 108 (e.g., ground). Resistor 114 has a second terminal connected to the second terminal of resistor 112. Resistor 116 is a load resistor and has a resistance value of RL. Generally, the load resistance (RL) 116 is a complex impedance of all of the telephone/cable line, receive circuitry, transformers, and like structures found in a common communication infrastructure. The load resistor 116 has a first node coupled to the second node of resistor 114 and a second node connected to a virtual ground node 108.

The amplifier 104 has a first input terminal coupled to the second terminal of resistor 114, and a second input terminal connected to the first terminal of resistor 114. A first output node of amplifier 104 is connected to the voltage reference terminal 108, and a second output node of amplifier 104 is connected to a first node of resistor 118.

While FIG. 2 specifically illustrates resistors, it should be understood that any resistive elements or components could be used to implement the resistive devices herein. For example, one or more of the elements 110, 112, 114, and 118 in FIG. 2 can be representative of any impedance device or combination of devices whether active, passive, or reactive, such as biased MOSFETs, JFETs, polysilicon resistors, diodes, well resistors, bipolar transistors, and/or the like.

In operation, resistor 114 has a resistance value R3 in Ohms that is chosen so that R3 is much smaller that the load resistance value RL. It is possible to monitor the current being sourced by the amplifier 102 through the load 116, by sensing the voltage across resistor 114 using Ohm's Law, where R3 does not add substantial resistance to the circuit. Based upon the voltage across resistor R3, it is possible to control the impedance synthesized by amplifier 102, using amplifier 104, such that line impedance matching is accomplished without using a large resistor between the amplifier 102 and the load 116. This feedback via op amp 104 allows the amplifier 102 to function using smaller drive voltages whereby power consumption is reduced in FIG. 2 over the power consumed by the circuit 10 of FIG. 1. Even though power is reduced, communication signal quality and distance is not adversely affected.

While circuit 100 is effective in reducing the overall voltage needed at the amplifier to drive the load resistor 116, the circuit of FIG. 2 is problematic since it requires that the amplifier 104 is designed to have a high degree of linearity. The requisite high degree of linearity results in problems associated with the design and manufacture of the amplifier 104. Process variations are more likely to affect the design of FIG. 2 whereby yield may be affected, and lithographic design shrinks will be more difficult to implement when using the design of FIG. 2. In addition, the circuit of FIG. 2 will consume much more silicon surface area that the circuit of FIG. 1. Regardless, the lower power consumed by the circuit of FIG. 2 may be worth the above trade-offs in terms of flexibility and circuit surface area.

Figure 6:
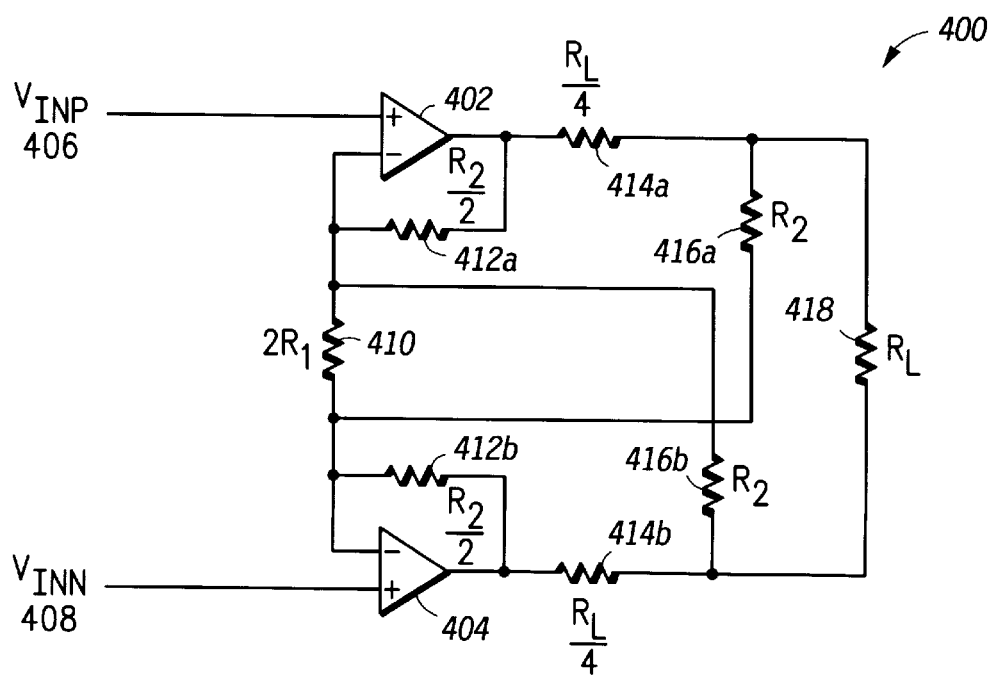
FIG. 6 illustrates, in a circuit schematic, a non-inverting embodiment analogous to the inverting embodiment illustrated in FIG. 3 in accordance with the present invention.

Another embodiment of the present invention which is believed to be an improvement over FIG. 2 is illustrated in FIG. 3 as circuit 200. Circuit 200 is improved over both circuit 10 and circuit 100 since circuit 200 has much reduced power consumption over circuit 10 and does so without the design difficulty and manufacturability problems associated with circuit 100. Therefore, while FIG. 2 is useful in some applications, FIG. 3 would be more likely to be an optimal design in a majority of the current communication applications (e.g., asymmetric digital subscriber line for communicating asymmetric digital subscriber line (ADSL) data). FIG. 3 generally includes differential amplifiers 202 and 204. FIG. 3 illustrates resistors 214a and 214b (each with a resistance value of R1), resistors 216a and 216b (each with a resistance value of R2), resistors 218a and 218b (each with a resistance value of R2/2), resistors 220a and 220b (each with a resistance value of RL/4), and a load resistor 222 (with a resistance value of RL). Differential amplifiers 202 and 204 are configured as inverting operational amplifiers to make the line driver 200 an inverting line driver (an analogous non-inverting solution is shown in FIG. 6 herein).

Differential input voltage signals VINP 206 and VINN 208 are received at by first terminals of resistors 214a and 214b respectively. VINP 206 represents a positive input voltage in the differential circuit and VINN 208 represents a negative input voltage in the differential circuit. The second terminals of resistors 214a and 214b are coupled to the negative inputs of their respective differential amplifiers 202 and 204 as shown. The positive terminals of amplifiers 202 and 204 are connected to ground 210 to complete the inverting amplifier configurations. Resistors 218a and 218b are respectively coupled in parallel across differential amplifiers 202 and 204. Specifically, the first terminal of each resistor 218a and 218b is coupled to the negative differential input of its respective differential amplifier 202 and 204, while the second terminal of each resistor 218a and 218b is connected to the output terminal of its respective differential amplifier 202 and 204. Resistor 220a and 220b each have a first terminal connected to the output of their respective differential amplifiers 202 and 204 and a second terminal for supplying one of either the positive output voltage (VOP) or the negative output voltage (VON).

Resistor 216a has a first terminal connected to the negative input of differential amplifier 202 and a second terminal connected to the second terminal of resistor 220b (i.e., VON). Resistor 216b has a first terminal connected to the negative input of differential amplifier 204 and a second terminal connected to the second terminal of resistor 220a (i.e., VOP). The resistors 216a and 216b provide negative feedback to their respective operational amplifiers 202 or 204. Load resistor (RL) 222 has a first terminal connected to the second terminal of resistor 220a and a second terminal connected to the second terminal of resistor 220b. The voltage provided to load resistor 222 from differential amplifiers 202 and 204 is a differential voltage between VOP and VON.

The operation of the circuit of FIG. 3 can best be understood by analyzing a half circuit, two of which are contained within the differential line driver of FIG. 3. Specifically, the impedance provided by amplifier 202, for example, is a function of the feedback circuitry including the combination of resistors 216a, 218a, and 220a in the top half of FIG. 3.

In operation, the combination of resistors 216a and 218a combine to measure the current through resistor 220a in order to adjust the closed loop gain of amplifier 202. The combination of elements 216a and 218a acts to dynamically adjust the closed loop gain of amplifier 202 such that the first terminal of resistor 220a appears to be driven by an ideal voltage source with a source impedance equal to RL/4. By adjusting the values of resistors 216a, 218a, and 220a, it is possible to adjust the synthesized source impedance value provided by the amplifier 202 to any value (see FIG. 5 for details and discussion of the design trade-offs in changing the percentage of the synthesized impedance in the op amps taught herein).

By synthesizing part of the source impedance within the half circuit that includes amplifier 202, it is not necessary to provide the same voltage levels at the output of the amplifier as is required in the prior art FIG. 1. Since some of the source resistance is now provided by the half circuit that includes operational amplifier 202, the operational amplifier has to supply less power at its output. Therefore, the operational amplifier 202 may drive a lower voltage at its output and consumes less power while still providing the same differential voltage magnitude across the load resistance (RL) 222 (e.g., transmission line) as is found in the prior art circuit of FIG. 1. As an example, if a load voltage of 10 volts at VOP is desirable, using the present invention it would be possible to provide a voltage of 15 volts at the output of amplifier 202 to obtain VOP=10 volts. The prior art circuit of FIG. 1 would require a voltage of 20 volts at the op amp output before a VOP voltage of 10 volts could be obtained.

Therefore, the circuit 200 of FIG. 3 is a lower power solution of FIG. 1 without compromising the distance over which the line driver can communicate. In other words, where FIG. 2 needs to provide 2*X voltage out of the op amp to get X volts at the transmission line terminals, the circuit of FIG. 3 can provide X volts at the transmission line terminals while providing less than 2*X volts but greater than X volts out of the op amps. In addition, the design of FIG. 3 is able to obtain the power savings discussed above by adding only a few passive linear devices that take up very small amount of area on a printed circuit board (PCB) or integrated circuit (IC). Therefore, the circuit of FIG. 3 is very area-effective. Also, the circuit of FIG. 3 is as easy to design and manufacture since no additional active components are needed as the circuit shown in FIG. 1.

Figure 4:
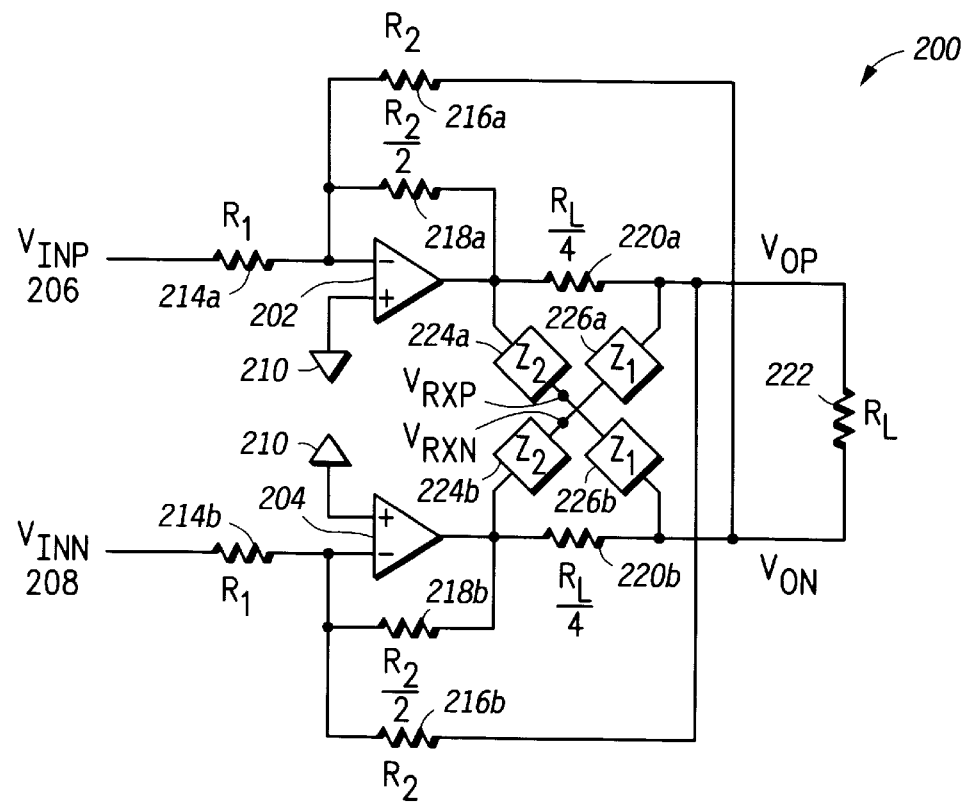
FIG. 4 illustrates, in a circuit schematic, the circuit of FIG. 3 including its local receive circuitry in accordance with the present invention.

FIG. 4 illustrates the use of cross-coupled impedances at the outputs of the line driver in order to extract a local receive signal from a transmitted signal generated from the far end of the communication line. One example of the use of such cross-coupled impedance devices is discussed in the U.S. Pat. No. 5,719,856, which is hereby incorporated by reference herein. FIG. 4 shows the cross coupled impedances Z2, elements 224a and 224b, and impedances Z1, elements 226a, 226b. The receive signal arriving from across the transmission line is taken at the intermediate nodes (VRXP and VRXN) between the Z2 and Z1 impedance networks.

Specifically, FIG. 4 illustrates an embodiment of the present invention where the load impedance synthesized by the amplifiers 202 and 204 is chosen to be approximately one-half that of the resistors 220a and 220b (e.g., a 50%/50% split of synthesized resistance to physical resistance). In other words, the total source impedance of the driver circuit is 50% comprised of impedance synthesized via the op amps and 50% provided by the physical resistive/impedance elements 220a and 220b in FIG. 4.

In this 50%/50% synthesized source resistance embodiment, or any synthesized embodiment, the receiver (Rx) gain across the terminals VRXP and VRXN is affected. The receive (Rx) gain is defined by the differential voltage received at the outputs VRXN and VRXP of the crossed coupled circuit, divided by the receive signal as seen across the nodes labeled VOP and VON in FIG. 4. As the percentage of synthesized resistance in the driver circuit increases, the receiver (Rx) gain reduces whereby extracting received signals becomes more difficult in the Z1/Z2 network. Depending upon the specific design, more or less synthesized op amp impedance may be used to optimize the trade-off between lower transmit power and loss of receive (Rx) gain.

Figure 5:
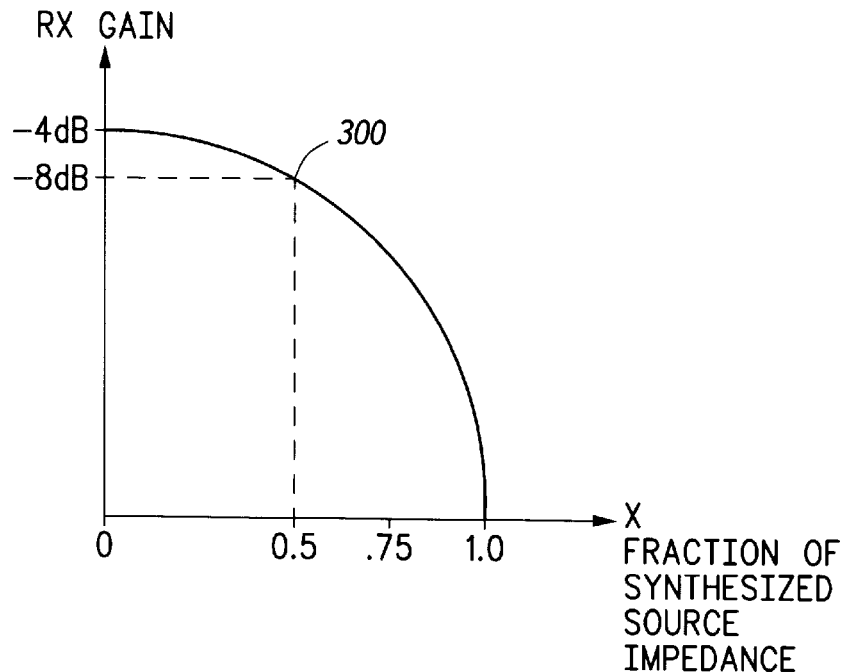
FIG. 5 illustrates, in an X-Y plot, the tradeoff of reduced receiver (Rx) gain as a function of synthesized source impedance within the circuit of FIG. 4 in accordance with the present invention.

This trade-off between receive (Rx) gain and lower power is shown in an X-Y plot of FIG. 5. FIG. 5 illustrates the received (Rx) gain as a function of the fraction (%) of impedance synthesized by the amplifiers 202 and 204 in FIGS. 3 or 4. As a greater portion of the impedance is synthesized via the op amps in FIG. 3, the received gain decreases as shown in FIG. 5. For example, given the values chosen in FIG. 3, where approximately one half (i.e., 50%) of the source impedance is synthesized, the receive (Rx) gain drops from −4 dB to approximately −8 dB. A design that uses less synthesized impedance (e.g., 25% synthesized impedance) would have less low power advantages while reducing the −4 dB loss in Rx gain. A design that uses more synthesized impedance (e.g., 75% synthesized impedance) would have improved low power performance but would have increased the Rx gain loss beyond the 50%/50% synthesized operating point 300 in FIG. 5.

Therefore, as a greater fraction of the source impedance is synthesized, the receive gain decreases. The relationship between the receive gain and the fraction of synthesized source impedance suggests that there is a practical limit to the amount of source impedance which can actually be synthesized, and still receive signals transmitted from a far end in any application. A designer needs to set the synthesized impedance of the design to find an optimal Rx gain/low power point for their specific applications.

A practical range of synthesized source impedance, would be between synthesizing approximately one-half (i.e., 50%) of the source impedance to approximately nine-tenths (i.e., 90%) of the source impedance. While synthesizing less than one-half of the source impedance using the present invention is feasible, it tends not to be optimal, because the transmit power costs can be further reduced with minimal increased cost in the receive path of the line driver.

FIG. 6 illustrates a noninverting version of the circuit of FIG. 3. Specifically, FIG. 3 represents an inverting line driver while FIG. 6 represents a non-inverting line driver. FIG. 6 includes operational amplifiers 402 and 404 as in FIG. 3. FIG. 6 also includes resistors 412a and 412b, resistors 414a and 414b, resistors 416a and 416b, resistors 418a and 418b, resistor 410 and resistive line model 418 (RL). Differential amplifiers 402 and 404 are configured as noninverting amplifiers in a noninverting line driver 400.

Differential input signals VINP 406 and VINN 408 are received at the non-inverting terminal of operational amplifiers 402 and 404. Resistor 410 (with a resistance value of 2R1) is connected between the inverting terminals of amplifiers 402 and 404. Resistors 412a and 412b have resistance values of R2/2, and are coupled in parallel across operational amplifiers 402 and 404 respectively, such that a first terminal of the resistor is coupled to the inverting input of its respective operational amplifier while the second terminal of the same resistor is connected to the output terminal of its respective operational amplifier.

Resistors 414a and 414b have a resistance value of RL/4, and each have a first terminal connected to the output of its respective amplifiers 402 and 404. Each of resistors 416a and 416b have values of R2, and their first terminals are respectively connected to the second terminals of resistors 414a and 414b, where these resistors 416a and 416b also have second terminals connected to the inverting inputs of amplifiers 404 and 402 respectively. Load resistor (RL) 418 is coupled between the second nodes of resister 414a and 414b.

It would be understood by one skilled in the art, that the advantages provided by the circuit of FIG. 6 would be similar to those provided by FIG. 3. However, because the circuit of FIG. 6 does not gain common mode signals, it has less common mode gain that the circuit of FIG. 3, which is advantageous in many applications.

Figure 7:
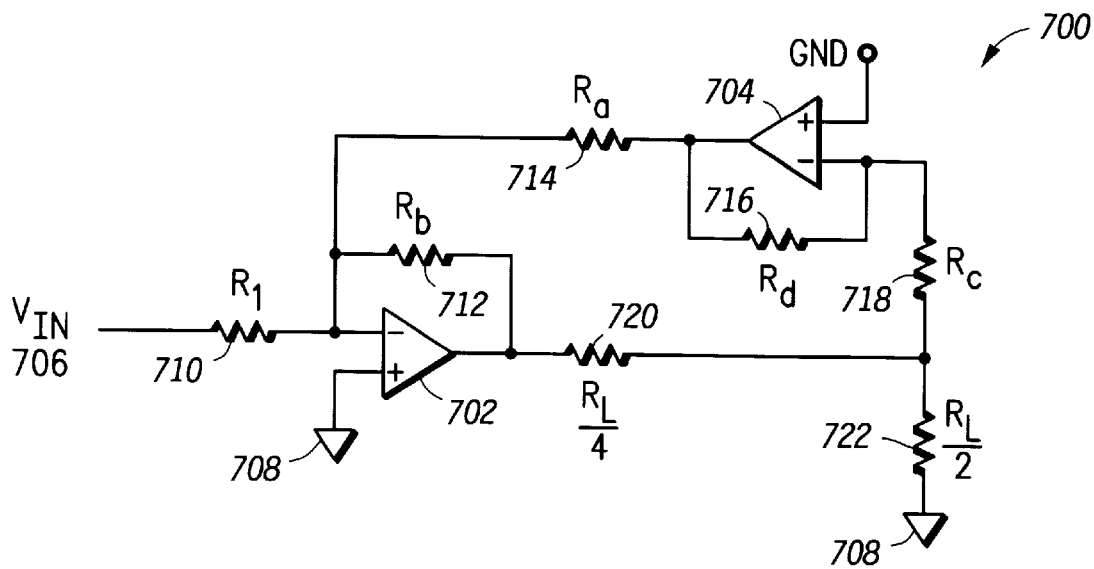
FIG. 7 illustrates, in a circuit schematic, a single ended line driver which has synthesized source impedance within the operational amplifier to reduce power consumption in accordance with the present invention.

FIG. 7 illustrates a circuit 700 that is a single-ended line driver embodiment of the differential line driver circuits discussed via FIGS. 3 through 6. Specifically, the voltage input (VIN) 706 is analogous to the input VINP 206 in FIG. 3. The resistor 710, 712, and 720 are receptively analogous to the resistors 214a, 218a, and 220a illustrated in FIG. 3. The op amp 702 in FIG. 7 is analogous to the op amp 202 in FIG. 3. In addition, the ground connection 708 is analogous to the ground connection 210 in FIG. 3. FIG. 7 illustrates a load resistance 722 which is half the load resistance 222 illustrated in FIG. 3 since the circuit of FIG. 7 is a single-ended solution.

FIG. 7 differs from FIG. 3 in that the feedback circuit of FIG. 3 only contains the resistor 216a coupled between the negative input of the op amp 202 and the negative output voltage (VON), whereas the feedback mechanism in FIG. 6 is more complex. In FIG. 7, the feedback mechanism which controls impedance synthesis has an operational amplifier 704, a first resistor 718, a second resistor 716, and a third resistor 714. FIG. 7 illustrates that the feedback mechanism used to control impedance synthesis within the op amp 702 need not be tapped off the complimentary output line, but may be tapped off of the same output line driven by the op amp 702. Such a non-complementary feedback connection can be made as long as an inversion device is used within the feedback path. In FIG. 7, the inversion is created by the op amp 704. In addition, FIG. 7 illustrates that other components other than resistive or impedance elements may be used in the feedback path in order to control impedance synthesis as taught herein.

Figure 8:
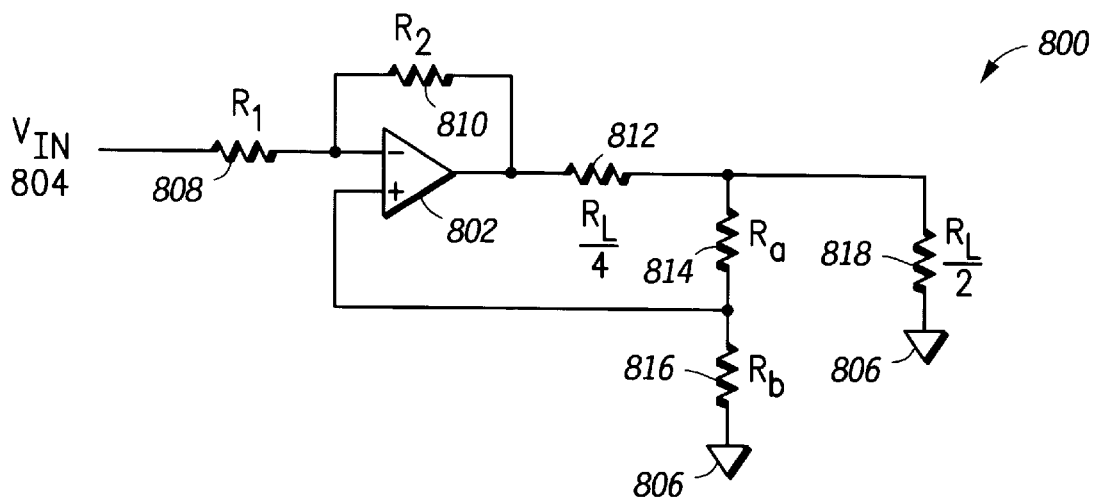
FIG. 8 illustrates, in a circuit schematic, a method for using a first input terminal of an operational amplifier to generate the output line voltage while using a second input terminal of the operational amplifier to synthesize impedance within the operational amplifier so that overall power consumption within the single ended line driver is reduced in accordance with the present invention.

FIG. 8 illustrates an alternative embodiment where one terminal of an operational amplifier is used to process the input voltage to provide the output voltage whereas the other terminal of the operational amplifier is used to synthesize impedance within the operational amplifier. Specifically, FIG. 8 illustrates a single output line driver 800 having an operational amplifier 802. The operational amplifier 802 of FIG. 8 is analogous to the operational amplifier 202 of FIG. 3. The input voltage (VIN) 804 is analogous to the positive input voltage (VINP) 206 in FIG. 3. The resistors 808, 810, 812, and 818 in FIG. 8 are respectfully analogous to the resistors 214a, 218a, 220a, and 222 in FIG. 3.

FIG. 8 illustrates that an impedance synthesizing feedback connection may be formed by a voltage divider containing resistive devices 814 and 816. These devices 814 and 816 provide a feedback signal to the positive terminal of the op amp 802. Such a feedback signal allows the operational amplifier 802 to synthesize output impedance whereby that synthesized output impedance when added to the resistance proved by element 812 so that the total source resistance of the line driver will match the external line resistance (RL/2) 818. By synthesizing impedance within the operational amplifier 802, reduced output voltages in operational amplifier 802 may be used to create the same magnitude of line voltages for transmission purposes whereby transmission distances are not compromised. Therefore, FIG. 8 illustrates an alternate embodiment of a low power line driver circuit.

Although the invention has been described and illustrated with reference to specific embodiments, it is not intended that the invention be limited to those illustrative embodiments. Those skilled in the art will recognize that modifications and variations may be made without departing from the spirit and scope of the invention. For example, an inverting or non-inverting line driver of many different configurations may be made in accordance with the synthesis methodology taught herein. Furthermore, these solutions may be single-ended or differential in operation. Also, the network to adjust the source impedance in the operational amplifier may be connected to the line connection of the complementary amplifier in the differential line driver application or to the line connection driven by the non-complementary amplifier. The network to adjust the source impedance of the operational amplifier may connect to the same input terminal as the input signal, or may connect to the complementary input from the input signal. In addition, the impedances shown are generally labeled and discussed as resistors, but reactive elements may substitute for all or part of the circuit elements. A transformer may be used to couple the line driver to the line. Therefore, it is intended that this invention encompass all of the variations and modifications as fall within the scope of the appended claims.

What is claimed is:

1. A line driver circuit, comprising:
   a first terminal for providing an input voltage;
   a first operational amplifier coupled to receive the input voltage via an input terminal, the first operational amplifier having an output terminal;
   first circuit means coupled to the input terminal of the first operational amplifier for synthesizing a portion of the source impedance of the line driver circuit using the operational amplifier; and
   second circuit means coupled to the output of the first operational amplifier for providing a remaining portion of the source impedance of the line driver circuit,
   wherein the line driver circuit communicates digital subscriber line (DSL) data.

2. The line driver circuit of claim 1 wherein the first and second circuit means are used to synthesize greater than or equal to 50% of the total source impedance attributed to the line driver circuit.

3. The line driver circuit of claim 1 wherein the first and second circuit means are used to synthesize greater than or equal to 75% of the total source impedance attributed to the line driver circuit.

4. A line driver circuit, comprising:
   a first terminal for providing an input voltage;
   a first operational amplifier coupled to receive the input voltage via an input terminal, the first operational amplifier having an output terminal;
   first circuit means coupled to the input terminal of the first operational amplifier for synthesizing a portion of the source impedance of the line driver circuit using the operational amplifier; and second circuit means coupled to the output of the first operational amplifier for providing a remaining portion of the source impedance of the line driver circuit, wherein the first circuit means is coupled to another operational amplifier that provides a complementary output voltage.

5. The line driver circuit of claim 1 wherein the line driver circuit communicates asymmetric digital subscriber line (ADSL) data.

6. The line driver circuit of claim 1 wherein the first terminal provides a positive input voltage, the line driver circuit further comprising:
   a second terminal for providing a negative input voltage;
   a second operational amplifier coupled to receive the negative input voltage via an input terminal, the second operational amplifier having an output terminal;
   third circuit means coupled to the input terminal of the second operational amplifier for synthesizing a portion of the source impedance of the line driver circuit using the second operational amplifier; and
   fourth circuit means coupled to the output of the second operational amplifier for providing a remaining portion of the source impedance of the line driver circuit.

7. The line driver circuit of claim 6 wherein the line driver circuit communicates asymmetric digital subscriber line (ADSL) data.

8. A line driver circuit, comprising:
   a first operational amplifier having an input terminal and an output terminal;
   a second operational amplifier having an input terminal and an output terminal;
   a first impedance element having a first terminal and a second terminal wherein the first terminal is coupled to the output terminal of the first operational amplifier;
   a second impedance element having a first terminal and a second terminal wherein the first terminal is coupled to the output terminal of the second operational amplifier;
   a third impedance element having a first terminal coupled to the second terminal of the second impedance element and a second terminal coupled to the input terminal of the first operational amplifier; and
   a fourth impedance element having a first terminal coupled to the second terminal of the first impedance element and a second terminal coupled to the input terminal of the second operational amplifier, wherein the line driver circuit communicates digital subscriber line (DSL) data.

9. The line driver circuit of claim 8 wherein the impedance elements function to synthesize a synthesized source resistance from the first and second operational amplifiers wherein the synthesized source resistance is greater than or equal to 25% of the total source resistance provided by the line driver circuit.

10. The line driver circuit of claim 8 wherein the impedance elements function to synthesize a synthesized source resistance from the first and second operational amplifiers wherein the synthesized source resistance is greater than or equal to 50% of the total source resistance provided by the line driver circuit.

11. The line driver circuit of claim 8 wherein the impedance elements function to synthesize a synthesized source resistance from the first and second operational amplifiers wherein the synthesized source resistance is greater than or equal to 75% of the total source resistance provided by the line driver circuit.

12. The line driver circuit of claim 8 wherein the voltage at the output of the first operational amplifier is less than twice the voltage at the second terminal of the first impedance element.

13. The line driver circuit of claim 8 wherein the differential voltage between the outputs of the first and second operational amplifiers is less than twice the differential voltage across the second terminals of the first and second impedance elements.

14. The line driver circuit of claim 8 wherein a fifth impedance element is coupled between the first terminal of the first impedance element and the input of the first operational amplifier.

15. The line driver circuit of claim 14 wherein a sixth impedance element is coupled between the first terminal of the second impedance element and the input of the second operational amplifier.

16. The line driver circuit of claim 8 wherein a fifth impedance element couples an input of the first operational amplifier to an input of the second operational amplifier.

17. A line driver circuit, comprising:
   a first terminal for providing an input voltage;
   a first operational amplifier coupled to receive the input voltage via a first input terminal, the first operational amplifier having an output terminal and a second input terminal;
   first circuit means having a second operational amplifier coupled to the second input terminal of the first operational amplifier for synthesizing a portion of the source impedance of the line driver circuit using the operational amplifier; and
   second circuit means coupled to the output of the first operational amplifier for providing a remaining portion of the source impedance of the line driver circuit.

18. The line driver circuit of claim 17 wherein the line driver communicates digital subscriber line (DSL) data.

19. A line driver circuit, comprising:
   an operational amplifier having a first input terminal, a second input terminal and an output terminal, the first input terminal coupled to an input voltage representing asymmetric digital subscriber line (ADSL) data and which is multiplied by a closed loop gain factor using the operational amplifier whereby an output voltage is generated at the output terminal, the second terminal being coupled to impedance elements to alter a source impedance provided by the line driver circuit so that power consumption in the line driver circuit is reduced.

* * * * *